(12) United States Patent
Duffy (10) Patent No.: US 10,412,300 B2
(45) Date of Patent: Sep. 10, 2019

(54) IMAGING APPARATUS FOR PROFESSIONAL-QUALITY PHOTOGRAPHY OF OBJECTS

(71) Applicant: Photon Ventures Inc., Ventura, CA (US)

(72) Inventor: Peter Anthony Duffy, Ventura, CA (US)

(73) Assignee: Photon Ventures Inc., Ventura, CA (US)

( * ) Notice: Subject to any disclaimer, the term of this patent is extended or adjusted under 35 U.S.C. 154(b) by 33 days.

(21) Appl. No.: 15/901,709

(22) Filed: Feb. 21, 2018

(65) Prior Publication Data

US 2019/0098205 A1   Mar. 28, 2019

Related U.S. Application Data

(60) Provisional application No. 62/565,045, filed on Sep. 28, 2017.

(51) Int. Cl.
*H04N 5/232* (2006.01)
*H04N 1/21* (2006.01)

(52) U.S. Cl.
CPC ..... *H04N 5/23222* (2013.01); *H04N 5/23216* (2013.01); *H04N 5/23293* (2013.01); *H04N 1/2112* (2013.01); *H04N 5/23229* (2013.01); *H04N 2201/0084* (2013.01)

(58) Field of Classification Search
CPC ............... G06T 17/20; H04N 5/23222; H04N 5/23216; H04N 5/23229; H04N 5/23293; H04N 1/00183
See application file for complete search history.

(56) References Cited

U.S. PATENT DOCUMENTS

2014/0104379 A1\*   4/2014   Glasgow ............... H04N 5/232
                                                        348/42

\* cited by examiner

*Primary Examiner* — Nicholas G Giles
(74) *Attorney, Agent, or Firm* — Ansari Katiraei LLP; Arman Katiraei; Sadiq Ansari (57) ABSTRACT

Provided is an imaging apparatus incorporating the "eye" of a professional photographer with photography equipment. The imaging apparatus obtains different sets of wireframes when photographing different objects. Each set of wireframes is keyed to a particular object and provides one or more of the proper framing, zooming/scaling, alignment, camera settings, and other characteristics with which to take professional-quality photographs of that particular object. The wireframes from a particular set of wireframes keyed to an object are sequentially presented on a display of the imaging apparatus. Each wireframe is overlaid atop a real-world view being captured by the apparatus camera in order to direct a shot of specific parts or aspects of the object. In some embodiments, each wireframe is also associated with post-processing routines that specify editing, adding effects or filters, or otherwise touching an image that is captured with the corresponding wireframe.

16 Claims, 9 Drawing Sheets

< Back                                                                                          Next >

Vehicle Type
| New | Used |

Is the Vehicle Ready?
| Yes | No |

Body Style
| Coupe | Sedan | SUV | Truck |

Vin Number
1FM5K8HT5HGA03889

Confirm Vin Number
1FM5K8HT5HGA03889

Vehicle Make
USED - SUV

Vehicle Model
EXAMPLE

IMAGING APPARATUS FOR PROFESSIONAL-QUALITY PHOTOGRAPHY OF OBJECTS

CLAIM OF BENEFIT TO RELATED APPLICATIONS

This application claims benefit to U.S. provisional application 62/565,045, entitled "System and Process to Aid Laypersons in Creating Professional-Level Photographs for use in Marketing and Industry and Methods of Use", filed Sep. 28, 2017. The contents of provisional application 62/565,045 are hereby incorporated by reference.

BACKGROUND ART

Professional-quality photography, both digital and film, is commonly used by vendors of goods and/or services to create attractive marketing and advertising for such goods and/or services. Professional-quality photography is the result of a combination of professional equipment and professional talent and experience.

The professional equipment typically includes at least a high resolution digital single-lens reflex (DSLR) cameras and one or more camera lens with multiple high-quality glass elements. Other equipment including lighting and reflective screens can also be used. This equipment is available to professional and amateur photographers alike, although the images that professional photographers take with the professional equipment are likely to differ greatly than the images that amateur photographers take with the same professional equipment. An inexperienced amateur photographer may fail to frame or align the imaged object properly or may fail to correctly set aperture, shutter speed, ISO, or other imaging controls of the camera properly. These and other factors under control of the camera operator greatly affect how the resulting photographs capture the imaged object, and more specifically, show off or otherwise accentuate the object's visual characteristics. The difference between stunning professional-quality images and generic amateur-level images, even when shot with the same equipment, can be the difference in selling the goods and services being photographed or at least generating the customer traffic for those goods.

Professional photographers have an "eye" for proper configuration of the camera settings and proper positioning of the object in the camera lens in order to produce the best shots of the object. However, professional photography is often too expensive for small vendors or vendors that have a sporadic need. Moreover, the time to produce the professional-quality photographs is too long for many vendors. For example, a vendor may obtain a new object. The vendor contacts the professional photographer who then comes onsite within a few days to set-up an ideal photo shoot and to take pictures of the object. The professional photographer then returns to an office to process, edit, or touch up (i.e., "photoshop") the images before returning the final pictures to the vendor. This process could take several days and sometimes weeks to complete. During this time, the object is retained by the vendor with a lower likelihood of being sold because of the lack of advertising or marketing. This is especially problematic if the vendor requires fast turnaround of the objects and is constantly receiving new inventory. For example, a dealer of automobiles, and especially used automobiles, is dependent on quickly receiving professional-quality images of the automobiles in order to generate interest and accelerate the sale of those automobiles, which, in turn, frees room on the dealer lot for more inventory.

Accordingly, there is a need to enable amateurs within a business to competently, cost effectively, and efficiently take a series of professional-quality images of inventory, goods, objects, and services without the time, expense, and experience of professional photographers. More specifically, there is a need for an imaging apparatus that allows any apparatus operator (amateur or otherwise) to take professional-quality images of different objects by automatically providing the proper framing, zooming/scaling, and alignment for those objects and by optionally configuring the optimal camera settings and correcting visual characteristics of the resulting images in an autonomous manner without manual user input or manual user control.

DETAILED DESCRIPTION

The imaging apparatus presented herein is a self-contained photography device that incorporates the "eye" of a professional photographer with photography equipment. More specifically, the imaging apparatus provides one or more of the proper framing, zooming/scaling, alignment, and other characteristics with which professional-quality photographs of different objects are taken by any layperson or amateur photographer having no prior photography experience or training. In some embodiments, the imaging apparatus configures camera settings specifically for each provided framing, zooming/scaling, alignment, and other characteristics of an image. In some embodiments, the imaging apparatus additionally post-processes each captured image by editing, adding effects or filters, or otherwise touching up each image based on post-processing routines defined for each provided framing, zooming/scaling, alignment, and other characteristics of an image. Consequently, the resulting images have a professional-quality and can be quickly presented on a website, in print, or on another medium for immediate advertising, marketing, and sale of the imaged goods.

The imaging apparatus breaks from traditional paradigms in which objects are received, a professional photographer for those specific objects is called in to set up and take images of the objects, the professional photographer post-processes the images offsite, the final images are returned to the vendor, and the vendor presents the images in one or more mediums through which the objects are advertised, marketed, or offered for sale. The imaging apparatus encapsulates all these steps in one continuous workflow that is performed or facilitated by the imaging apparatus. In some embodiments, the imaging apparatus executes this continuous workflow in one unit or device with any person at the controls. Consequently, the imaging apparatus produces professional-quality images of different objects in a fraction of the time and at a fraction of the cost of the traditional paradigms that the imaging apparatus is intended to replace.

Figure 1:
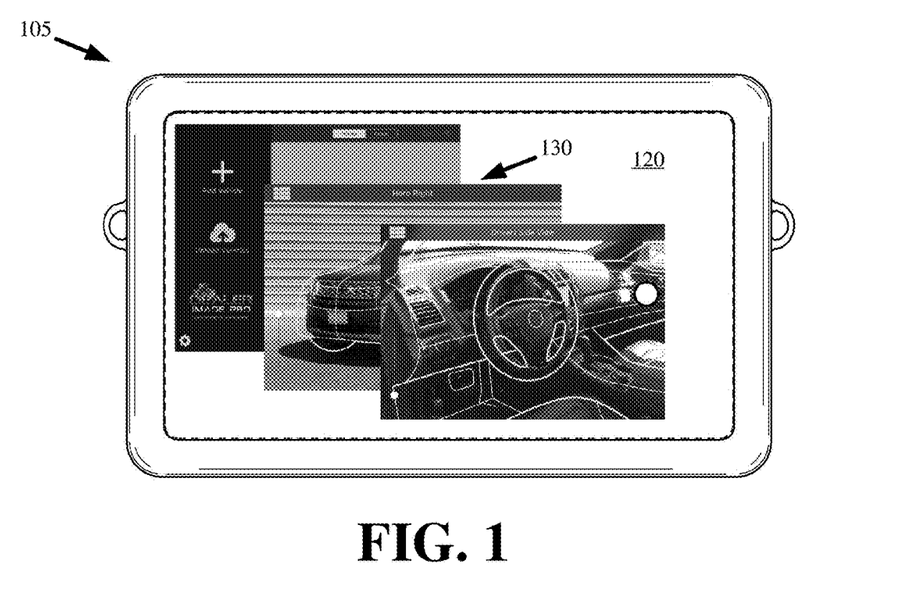
FIG. 1 presents a front view of the imaging apparatus.
Figure 2:
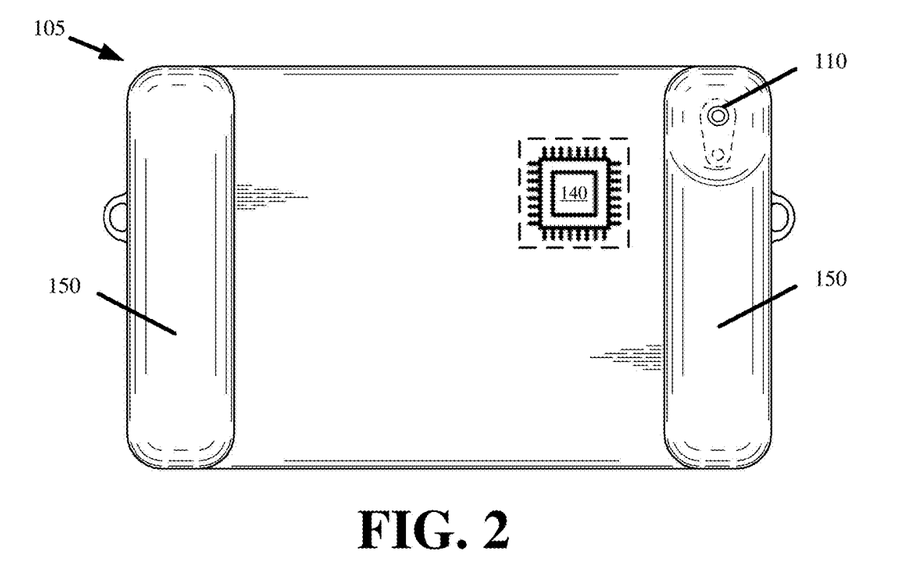
FIG. 2 presents a back view of the imaging apparatus.
Figure 3:
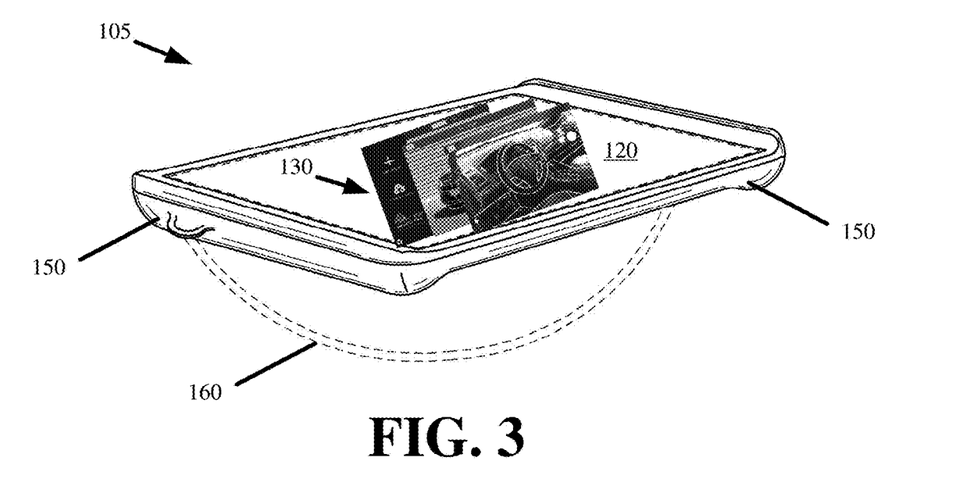
FIG. 3 presents a top angular view of the imaging apparatus.
Figure 4:
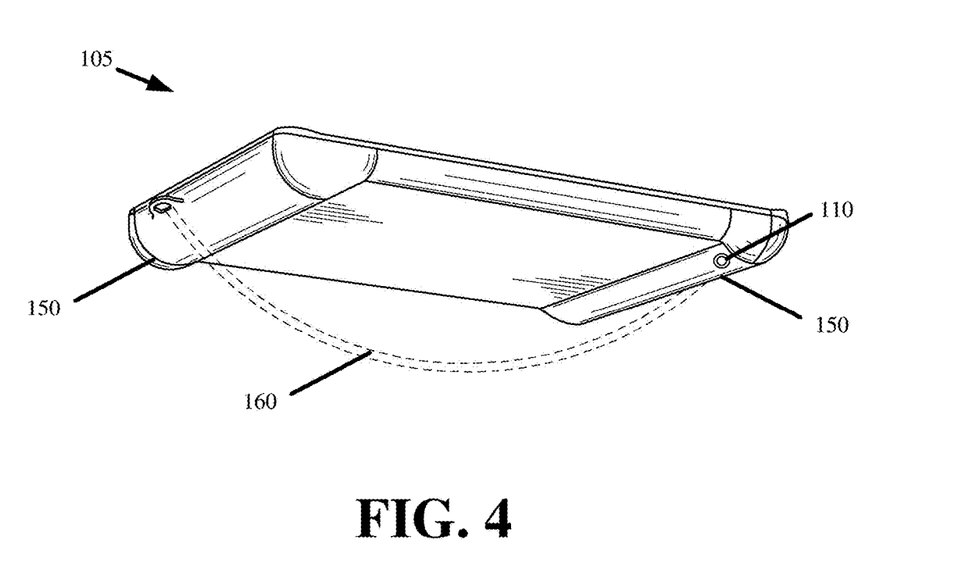
FIG. 4 presents a bottom angular view of the imaging apparatus.

FIG. 1 presents a front view of the imaging apparatus 105, FIG. 2 presents a back view of the imaging apparatus 105, FIG. 3 presents a top angular view of the imaging apparatus 105, and FIG. 4 presents a bottom angular view of the imaging apparatus 105 in accordance with some embodiments. As can be seen from the various figures, the imaging apparatus 105 has a camera 110, display 120, framing user interface (UI) 130 modifying the display 120, image processor 140, storage (not shown), control handles 150, and a carrying strap 160. The imaging apparatus 105 optionally includes network connectivity with one or more wired interfaces or wireless radios providing Bluetooth, WiFi, 4G long term evolution, or 5G network connectivity. The imaging apparatus 105 can take other forms in other embodiments whereby the shape, structure, or components of the imaging apparatus 105 are modified.

The camera 110 is a high resolution digital imaging sensor preferably greater than five megapixels. In some other embodiments, the digital imaging sensor is replaced with a traditional film sensor. The camera 110 preferably has a lens with digital or optical image stabilization, a fixed or variable focal length ranging between 18 and 100 millimeters, and a fixed or variable aperture having an f-stop ranging between 1.6 and 22. In some embodiments, the lens is fixed. Other embodiments of the camera 110 support an interchangeable lens.

The display 120 is preferably a liquid crystal display (LCD) greater than four inches. Other embodiments may use different display technologies such as an active-matrix organic light-emitting diode (AMOLED) for the display 120. The display 120 presents the framing UI 130 overlaid on, adjacent, or in place of a real-time view from the camera 110, wherein the real-time view comprises continuously presenting and updating real-time images captured by the camera 110 on the display 120. In some embodiments, the display 120 is a touchscreen. The touchscreen acts as an input device for receiving user input based on touches of the user relative to positioning of UI elements by the framing UI 130.

The framing UI 130 comprises different sets of wireframes. Each set of wireframes is overlaid in the display 120 atop the presentation of the real-world view captured from the camera 110. Each set of wireframes provides one or more of the proper framing, zooming/scaling, alignment, manual camera settings, and other characteristics for producing a sequence of professional-quality photographs for a different object. The framing UI 130 enhances the camera 110 and the overall imaging apparatus 105 to a specialized imaging tool for professional photography.

The image processor 140 captures digital images within the camera 110 field of view and stores the images as digital files on the imaging apparatus storage. The storage can also be used to store the sets of wireframes for the framing UI 130 as well as different camera settings and post-processing routines with each wireframe or set of wireframes.

In some embodiments, the image processor 140 performs real-time image processing to determine alignment between a wireframe overlaid on the display 120 and one or more objects or one or more parts of an object within the camera field of view that are also presented on the display 120. In response to detecting substantial alignment between the wireframe and the one or more objects or parts of the object, the image processor 140 operates and controls the camera 110 shutter in order to snap a photograph autonomously without user activation of the shutter.

In some embodiments, the image processor 140 adjusts settings of the camera 110 before taking the photograph. The adjustments are based on camera settings defined for the current wireframe overlaid onscreen at the time the image is taken or for the selected set of wireframes from which the current wireframe overlaid onscreen is obtained. This includes adjusting one or more of the camera's aperture, shutter speed, and ISO not based on the amount of light or other parameters monitored by the camera's imaging sensor as done by traditional cameras with automatic settings. Instead or in addition to these prior art setting adjustments, the image processor 140 adjusts the camera 110 according to a specific set of settings (i.e., aperture, shutter speed, and ISO settings) that are configured for the current wireframe or for the selected set of wireframes.

In some embodiments, the image processor 140 post-processes images obtained from the camera by editing, adding effects or filters, or touching up the images. The post-processing adjustments are based on different sets of post-processing routines that are defined for the different wireframes of the framing UI 130. More specifically, the post-processing of a particular image is performed based on a particular set of post-processing routines configured for the specific wireframe that is overlaid on the screen at the time the image is taken. Each of the different post-processing routines contains different adjustments to the image. The adjustments can be to the contrast, brightness, hue, color saturation, and other levels or properties of the image captured by the camera 110. The adjustments can also include effects (e.g., lens flare, blurring, sharpening, solarizing, etc.) that are applied to the image.

The control handles 150 allow for easy handling and manipulation of the imaging apparatus 105. In some embodiments, the control handles 150 provide a gripped surface with which to hold and manipulate the imaging apparatus 105. The camera 110 integrated as part of one of the control handles 150. Alternatively, the camera 110 can be centrally located on the back of the imaging apparatus 105 with the control handles 150 on either side of the camera 110 and display 120. In some embodiments, the control handles 150 include input devices in the form of one or more buttons, control sticks, touchpads, or other actuators for controlling the camera 110 shutter and settings and for interacting with the framing UI 130.

Although the imaging apparatus 105 can be an entirely standalone device, some embodiments provide network connectivity for networked interaction with other devices. In some embodiments, the network connectivity transfers the final photographs to another device for presentation directly thereon. For example, the network connectivity allows the imaging apparatus 105 to integrate directly with the website or back-end systems of the vendor in order to upload the final photographs thereon a short time after the original photographs are taken. The network connectivity further allows for the offloading of the sets of wireframe to cloud storage. The frame UI 130 can then access a specific set of the wireframes as it is needed for imaging a particular object. The network connectivity can also be used to offload the image processing from the local image process 130 to cloud machines.

Figure 5:
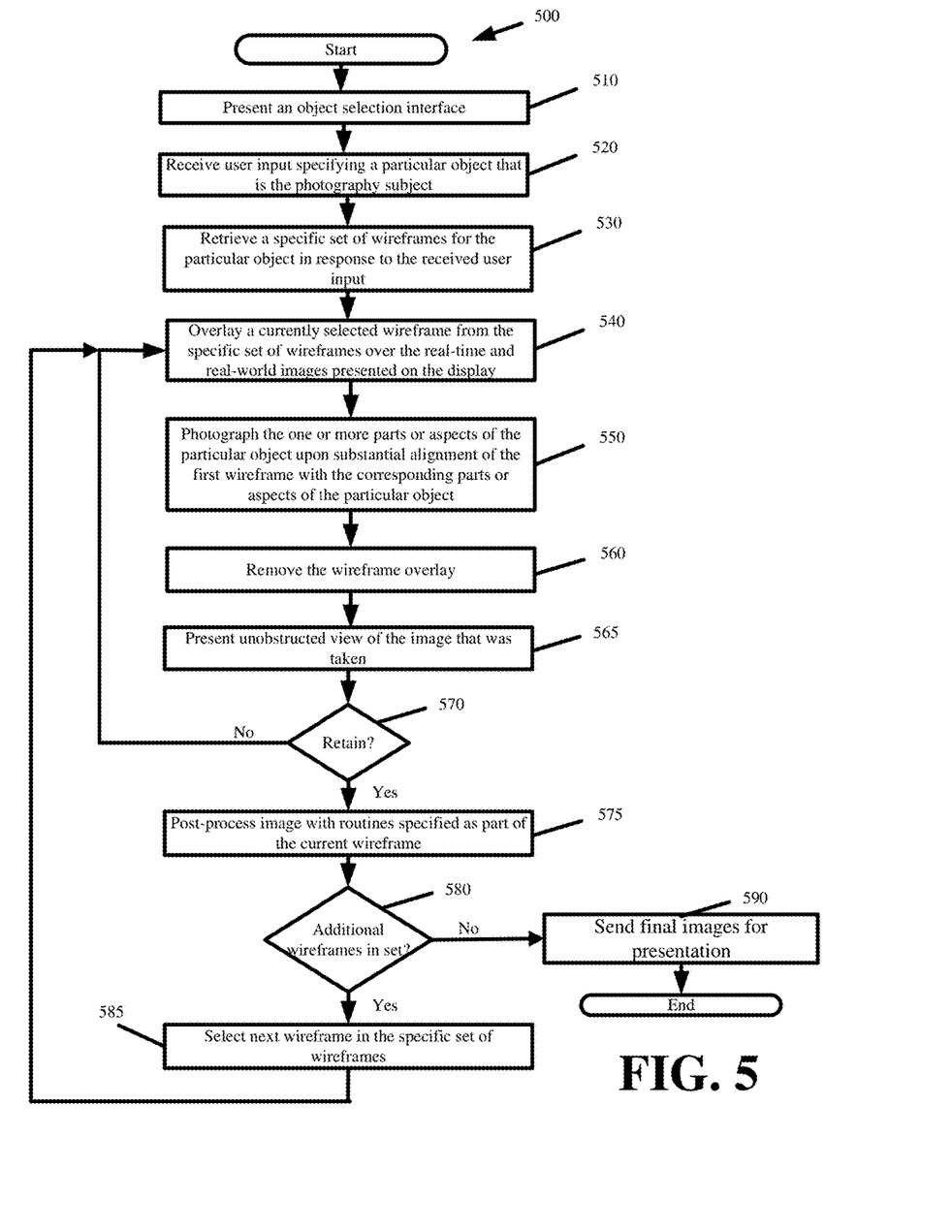
FIG. 5 presents a process for producing professional-quality photographs using the imaging apparatus of some embodiments.
Figure 6:
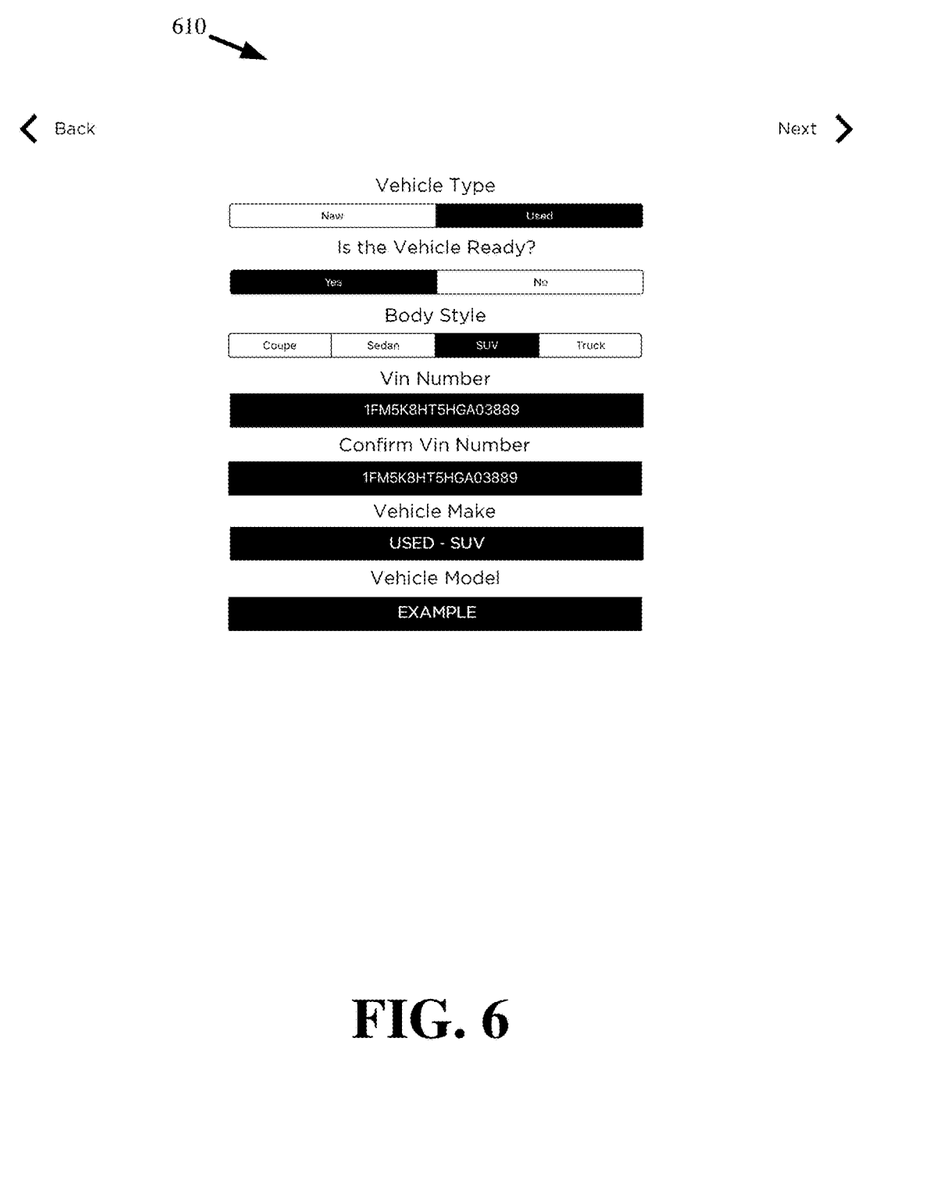
FIG. 6 illustrates an exemplary object selection interface in accordance with some embodiments.

FIG. 5 presents a process 500 for producing professional-quality photographs using the imaging apparatus of some embodiments. The process 500 commences by presenting (at 510) an object selection interface from the frame UI on the display of the imaging apparatus. FIG. 6 illustrates an exemplary object selection interface 610 in accordance with some embodiments. The object selection interface 610 is an interface with which the user specifies the object that is to be photographed. The object selection interface 610 of FIG. 6 allows a user to specify a make and model of a vehicle. Alternatively, the user can enter the vehicle identification number (VIN) of the vehicle to be photographed. The VIN can be manually entered or an image of the VIN can be taken using the imaging apparatus camera with subsequent image processing detecting and extracting the VIN from the image. The object selection interface 610 is keyed to identifying different vehicles. In some other embodiments, a set of drop down boxes or other input fields can be used to select from a variety of different objects (e.g., houses, boats, motorcycles, electronic devices, furniture, clothing, etc.) that the user wishes to professionally photograph. In other words, the imaging device is not constrained to producing professional-quality photographs for a particular object, and has utility for producing professional-quality photographs for a variety of objects in the same and different categories or classes of objects.

The process receives (at 520) user input specifying a particular object that is the photography subject. The user input can be entered with touches registered on the display touchscreen, physical controls on the control handles, or with the imaging apparatus camera taking a picture of the particular object or identifying information about the particular object (e.g., a barcode, VIN, quick response code, or other visual marker).

The process retrieves (at 530) a specific set of wireframes from the different sets of wireframes for the particular object in response to the received user input. The specific set of wireframes comprises a sequence of wireframes that are keyed to the particular object with each wireframe from the sequence targeting a different perspective, angle, or part of the particular object. In the use case of automobiles, the specific set of wireframes can be for a specific make and model (i.e., Honda Accord). Alternatively, the specific set of wireframes can be for a particular class of automobiles (i.e., sedans versus sport utility vehicles or sports cars). In either case, the specific set of wireframes pertains in some capacity whether exactly or categorically to the particular object.

Each wireframe in the specific set of wireframes provides a skeletal framework or outline for photographing with professional-quality one or more different parts or aspects of the particular object. More specifically, the skeletal framework of each wireframe provides specific framing, zooming/scaling, alignment, and other visual characteristics at which to photograph one or more parts or aspects of the particular object with professional-quality.

The process overlays (at 540) a first wireframe from the specific set of wireframes over the real-time and real-world images captured by the imaging apparatus camera and that are presented on the imaging apparatus display. The overlaying step modifies the display and produces a first presentation from the framing UI.

Figure 7:
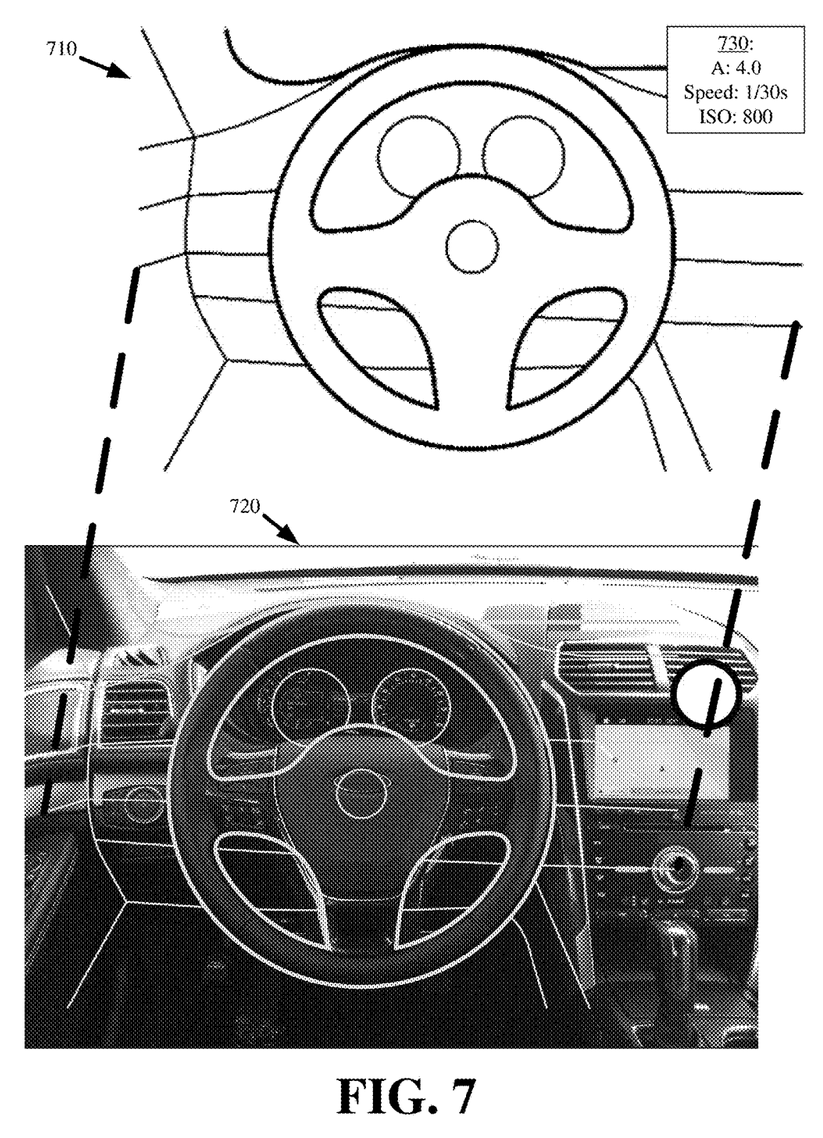
FIG. 7 illustrates a first wireframe from a specific set of wireframes and overlaying the first wireframe atop a real-world image captured from the imaging apparatus camera that is presented on the display in accordance with some embodiments.

FIG. 7 illustrates a first wireframe 710 from a specific set of wireframes and overlaying the first wireframe 710 atop a real-world image 720 captured from the imaging apparatus camera that is presented on the display in accordance with some embodiments. As can been, the first wireframe 710 is a skeletal framework or outline for photographing one or more particular parts or aspects of an object at a particular angle, distance, and alignment. In this figure, the skeletal framework is a particular framing, zooming, and alignment for the steering column of a particular automobile. The figure further illustrates the first wireframe being associated with specific aperture, shutter speed, and ISO settings 730 for the camera at which the image should be shot.

The process photographs (at 550) with the camera of the imaging apparatus, the one or more parts or aspects of the particular object upon substantial alignment of the first wireframe with the corresponding parts or aspects of the particular object. The user manipulates and repositions the imaging apparatus using the control handles until the one or more parts or aspects of the particular object appears in the field of view of the camera and is presented in the imaging apparatus display with substantial alignment to the first wireframe. In some embodiments, the image processor of the imaging apparatus activates the camera shutter to take the photograph in response to monitoring and detecting for the substantial alignment. The image processor digitizes the field of view that is being captured by the camera and performs feature matching of the image against the first wireframe. The feature matching involves detecting when features in the camera image match against the outlines of the wireframe by some threshold amount (e.g., >75%). In some other embodiments, the user activates the camera upon visually detecting the substantial alignment. Step 550 produces a raw image file or TIFF, JPEG or other converted digital image file.

The process removes (at 560) the wireframe overlay and presents (at 565) an unobstructed view of the image that was taken. The process provides (at 570) an option to reshoot the object in which case the process reverts to step 540, or retain the image and continue through the set of wireframes.

In response to the user retaining the image, the process optionally post-processes (at 575) the photograph after it is taken. As noted above, processing the image may include editing, touching up, adding effects or filters, or otherwise changing visual characteristics of the image (e.g., hue, brightness, saturation, etc.) according to postprocessing routines associated with the current selected wireframe (i.e., the first wireframe). For example, the first wireframe may involve photographing the rear exterior of a vehicle. In this case, the image processing may include decreasing the brightness to increase shine while increasing saturation to increase the color depth. A subsequent wireframe may photograph the interior of the vehicle and, in this case, the image processing may increase the brightness and contrast to bring out the detail. In some embodiments, the process uploads the photograph for remote processing.

Contemporaneous with or without the photograph process, the process checks (at 580) if there are other wireframes in the specific set of wireframes to cycle through. Since each set of wireframes is for a sequence of images, the process continues by selecting (at 585) the next wireframe in the specific set of wireframes unless all the wireframes of the specific set of wireframes have been cycled through, in which case, the process sends (at 590) the final images for presentation. In response to selecting the next wireframe, the process reverts to step 540 using the wireframe that was newly selected.

In embodiments without image postprocessing, the final images are the photographs taken according the specific set of wireframes. In embodiments with image postprocessing, the final images that are presented are photographs taken with the imaging apparatus camera that have been modified in some respect by one or more postprocessing routines associated with the wireframes from which the images were taken. Some embodiments perform a batch postprocessing of the images after all the photographs for the specific set of wireframes have been taken. The batch postprocessing can be completed on the imaging apparatus or remotely in the cloud. The final images can be directly sent to the back-end system of a vendor where the final images are uploaded and presented on a website or through other advertising or marketing mediums. The location to which the final images are sent can be specified as part of registering for an account to use with the imaging apparatus.

Figure 8:
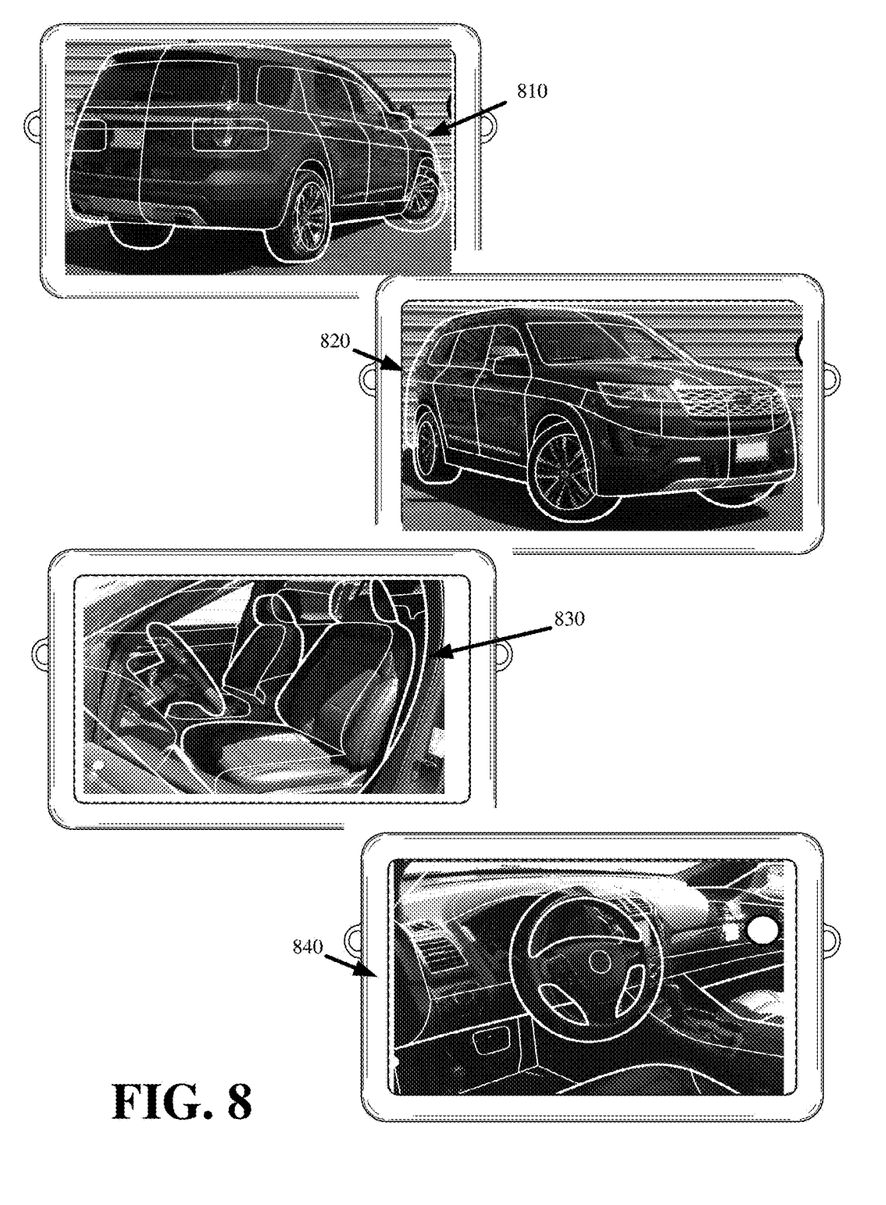
FIG. 8 illustrates a sequence of wireframes from a specific set of wireframes for professionally photographing different parts or aspects of a particular vehicle in accordance with some embodiments.

FIG. 8 illustrates a sequence of wireframes 810, 820, 830, and 840 from a specific set of wireframes for professionally photographing different parts or aspects of a particular vehicle in accordance with some embodiments. Each wireframe 810, 820, 830, and 840 in the sequence targets different one or more parts or aspects of the particular vehicle. More specifically, each wireframe 810, 820, 830, and 840 provides a guide for photographing the different one or more parts or aspects with different framing, zooming/scaling, alignment, and other characteristics. Some of the wireframes direct the camera to a perspective angle, other wireframes direct the camera to straight-on angle, and still other wireframes direct the camera to image from the top and at different distances from the target object.

Figure 9:
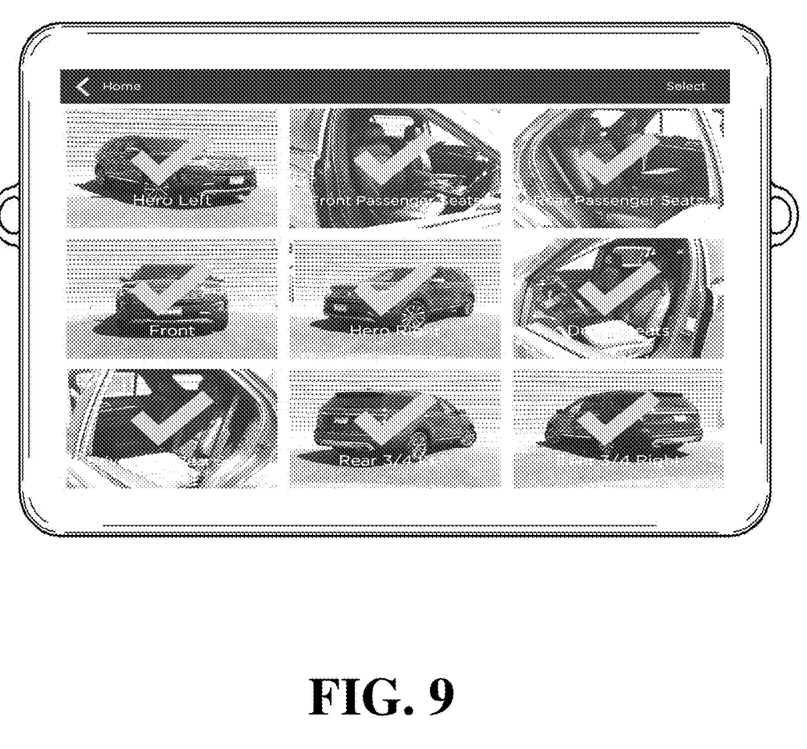
FIG. 9 illustrates a completed sequence of images resulting from a particular set of wireframes in accordance with some embodiments.

FIG. 9 illustrates a completed sequence of images resulting from a particular set of wireframes in accordance with some embodiments. This figure illustrates nine professional-quality images or photographs that comprise a completed sequence. The resulting images can be postprocessed or sent off the imaging apparatus for presentation to customers on one or more mediums.

In some embodiments, the user account stores current and previous photographs taken by the user and an inventory of objects to which the photographs relate. The stored inventory of objects provides a quick way for the user to select a particular set of wireframes from the different sets of wireframes. The stored photographs allow the user to save time and money by reusing previously taken photographs upon receiving additional units of the same object.

Figure 10:
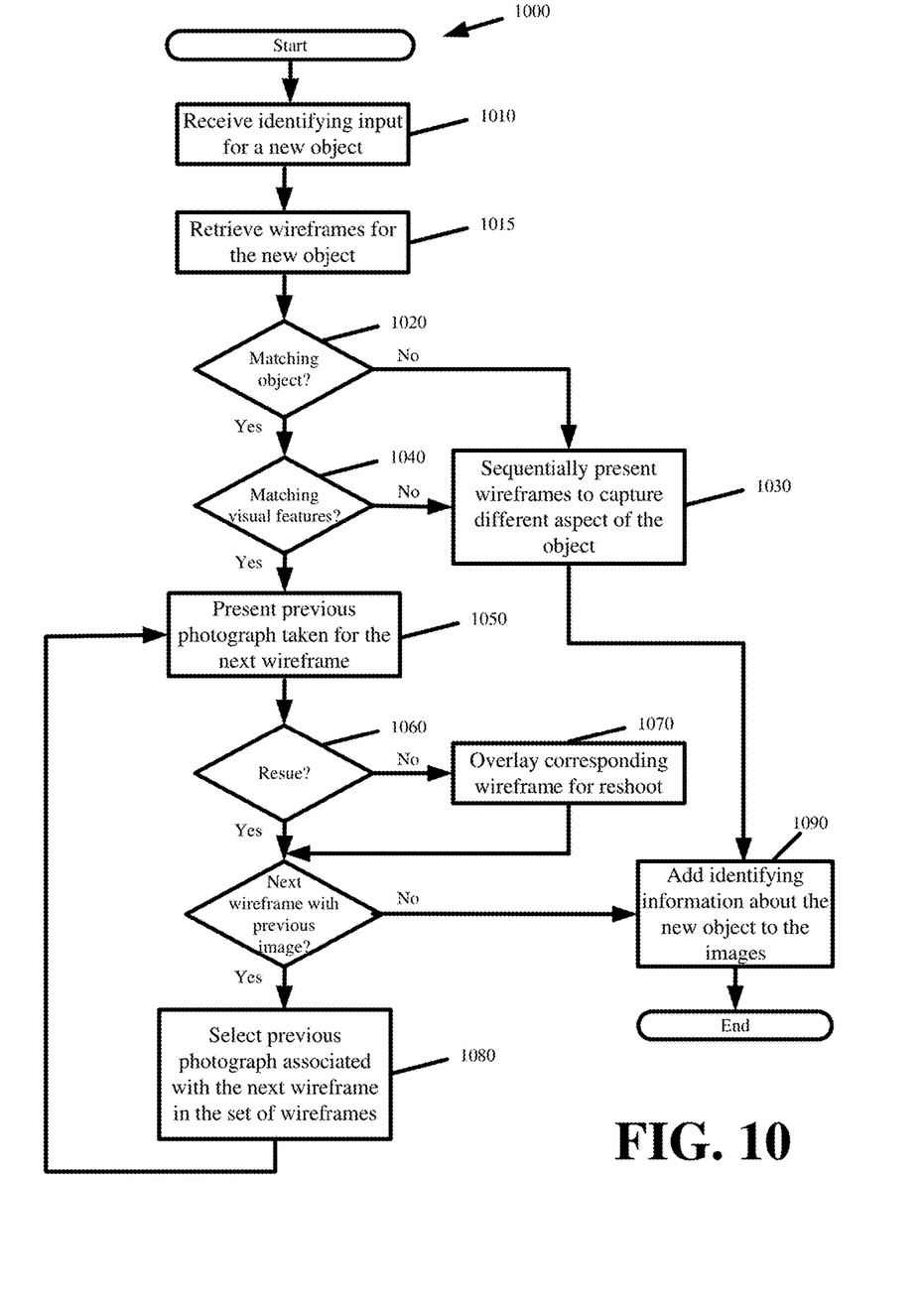
FIG. 10 presents a process for reusing photographs of a previous object in the presentation of a new object.

FIG. 10 presents a process 1000 for reusing photographs of a previous object in the presentation of a new object. The process 1000 commences in response to receiving (at 1010) identifying input for a new object from the object selection interface. The user can once again identify the object through a series of drop down boxes, text fields, or by scanning or imaging an identifier such as a VIN, barcode, or serial number.

The process retrieves (at 1015) the specific set of wireframes for the new object. The process then determines (at 1020) if the identifying input for the new object matches a previous object that is entered in the inventory of objects with previous sets of photographs.

If no match, the process sequentially presents (at 1030) the wireframes on the imaging apparatus until the new object is properly photographed. In response to a match, the process further determines (at 1040) if the matching objects also have matching visual features or characteristics. The identifying input should convey or at least allow for the retrieval of the visual features or characteristics of the new object such as color, version or model number, and enhancements as some examples. In some cases, the visual features or characteristics can be obtained from the object identifier (e.g., VIN, barcode, serial number, etc.). The identification of the visual features or characteristics is important because the previous photographs should be used when the newly received object has the same visual characteristics as the previous object. For example, the user would not want to use images of a blue Honda Accord when trying to sell a red Honda Accord even when the make, model, year, and trim are identical.

In response to the visual features or characteristics of the new object and previous object differing, the process moves to steps 1030. In response to the visual features or characteristics matching, the process presents (at 1050) on the display of the imaging apparatus, the previous (and optionally processed) photograph taken for the first wireframe in the specific set of wireframes with options to reuse (at 1060) or reshoot the image.

Reshooting the image involves clearing the display of the previous photograph, presenting the camera's field of view onscreen, and overlaying (at 1070) the first wireframe over the field of view. Once the user is satisfied with an image for the first wireframe, the process selects (at 1080) the previous photograph taken for the object with the next wireframe in the specific set of wireframes. If all images and wireframes are complete, the process moves to step 1090. Otherwise, the process reverts to step 1050 with the next selected previous photograph for the next wireframe in the set of wireframes.

Once the photographs for the new object are complete, whether through reusing or reshooting the images, the user adds (at 1090) unique identifying information about the new object to be associated with the images. For example, the user may choose to reuse exterior and interior images of a prior 2017 Honda Accord EX for a newly received 2017 Honda Accord EX with the same trim and color. However, the reused images are associated with the VIN and/or window sticker that is unique to the new vehicle. The images and corresponding information can then be edited in the back-end or uploaded for presentation of the new object.

In some embodiments, the imaging apparatus operates in conjunction with a back-end system to provide a time-to-market tracker. When a new object is received and photographed, the imaging apparatus sends the set of photographs for the new object to the back-end system with an age of zero days. The back-end system communicably couples with the vendor's system to present the photographs in conjunction with the sale of the new object and to track the sale of the new object. The back-end system color codes the different objects being tracked based on the length of time they remain unsold. In particular, the color coding draws attention to the objects that remain unsold past an expected sale date. For example, if a vehicle is 0-5 days old, then it will be identified with a white line and dots; 6-9 days in age will be identified as a yellow line and dots; and 10 days or older are marked in red. Once the vehicle has completed the process, the entire line turns green and moves to the bottom of the page as completed. For the objects that remain unsold, the vendor can be notified and directed to retake the photographs with a different set of wireframes for a different presentation in an attempt to regenerate interest in the object.

Figure 11:
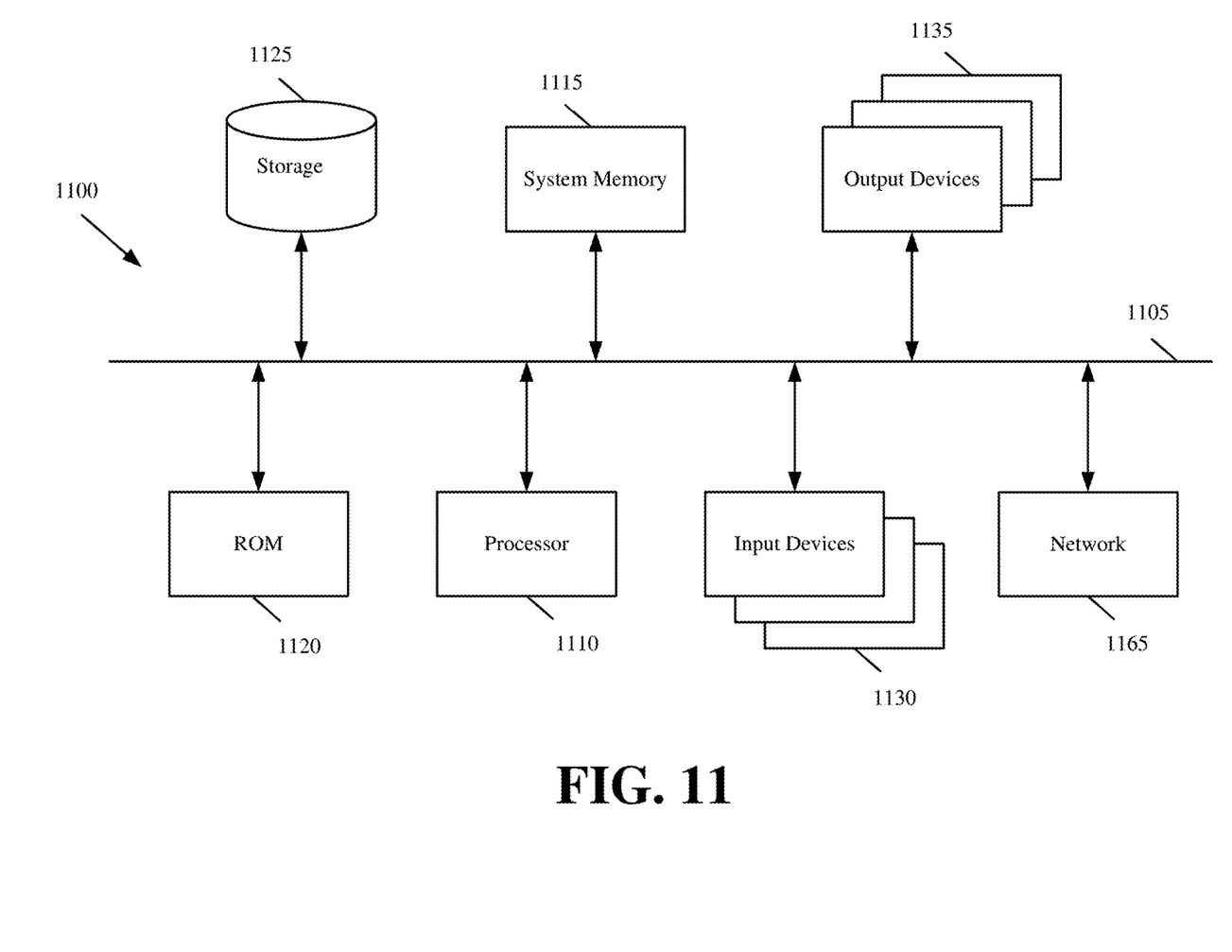
FIG. 11 illustrates additional hardware components of the imaging apparatus of some embodiments.

FIG. 11 illustrates additional hardware components of the imaging apparatus of some embodiments. The imaging apparatus 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the imaging apparatus 1100. For instance, the bus 1105 communicatively connects the processor 1110 with the read-only memory 1120, the system memory 1115, and the permanent storage device 1125. From these various memory units, the processor 1110 retrieves instructions to execute and data to process in order to execute the processes of the invention. The processor 1110 is a processing device such as a central processing unit, integrated circuit, graphical processing unit, etc.

The read-only-memory (ROM) 1120 stores static data and instructions that are needed by the processor 1110 and other modules of the system. The permanent storage device 1125, on the other hand, is a read-and-write memory device. This device is a non-volatile memory unit that stores instructions and data even when the imaging apparatus 1100 is off. Some embodiments of the invention use a mass-storage device (such as a magnetic or optical disk and its corresponding disk drive) as the permanent storage device 1125.

Other embodiments use a removable storage device (such as a flash drive) as the permanent storage device Like the permanent storage device 1125, the system memory 1115 is a read-and-write memory device. However, unlike storage device 1125, the system memory is a volatile read-and-write memory, such as random access memory (RAM). The system memory stores some of the instructions and data that the processor needs at runtime. In some embodiments, the processes are stored in the system memory 1115, the permanent storage device 1125, and/or the read-only memory 1120.

The bus 1105 also connects to the input and output devices 1130 and 1135. The input devices enable the user to communicate information and select commands to the system. The input devices 1130 include alphanumeric keypads (including physical keyboards and touchscreen keyboards), pointing devices. The input devices 1130 also include audio input devices (e.g., microphones, MIDI musical instruments, etc.). The output devices 1135 display images generated by the system. The output devices include printers and display devices, such as cathode ray tubes (CRT) or liquid crystal displays (LCD).

Finally, as shown in FIG. 11, bus 1105 also couples computer 1100 to a network 1165 through a network adapter (not shown). In this manner, the computer can be a part of a network of computers (such as a local area network ("LAN"), a wide area network ("WAN"), or an Intranet, or a network of networks, such as the Internet).

As mentioned above, the imaging apparatus 1100 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In preferred embodiments, the imaging apparatus is implemented as a specialized device. In some other embodiments, the imaging apparatus can be implemented on tablets, laptops, smartphones, and other devices having the above described components with specialized software transforming these devices into the imaging apparatus described herein.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. An imaging apparatus directing professional-quality photography of a plurality of vehicles, the imaging apparatus comprising:

a camera;

a display presenting real-time images from the camera;

an input interface comprising at least one input field with which a user selects a particular vehicle from the plurality of vehicles;

a graphical user interface ("GUI") comprising a set of wireframes with each wireframe from the set of wireframes providing a skeletal framework at which a different part or aspect of the particular vehicle is to be imaged; and a non-transitory computer-readable medium storing a set of processor-executable instructions; and one or more processors configured to execute the set of processor-executable instructions, wherein executing the set of processor-executable instructions causes the one or more processors to:

receive, via the input interface, a vehicle identifier of the particular vehicle, wherein the vehicle identifier comprises at least one of a Vehicle Identification Number ("VIN") or a make and model of the particular vehicle;

select from different sets of wireframes, that provide skeletal frameworks corresponding to different exteriors and interiors of different vehicle makes and models, the set of wireframes, that provides skeletal frameworks specific to an exterior and an interior of a particular make and model of the particular vehicle, wherein said selecting is based on the vehicle identifier;

present the GUI in the display with a first wireframe, from the set of wireframes, atop the real-time images, wherein the first wireframe provides a skeletal framework of the exterior of the particular vehicle from a first perspective; and change the GUI from presenting the first wireframe to presenting a different second wireframe from the set of wireframes in response to capturing an image of the exterior of the particular vehicle at the first perspective, the second wireframe providing a skeletal framework of the interior of the particular vehicle from a second perspective.

2. The imaging apparatus of claim 1, wherein the set of processor-executable instructions further include instructions to:

detect alignment between the skeletal framework of the first wireframe and the exterior of the particular vehicle; and capture the image by activating the camera in response to said detecting.

3. The imaging apparatus of claim 1, wherein the set of processor-executable instructions further include instructions to:

postprocess the image using a set of image adjustments specified as part of the first wireframe, wherein postprocessing the image comprises modifying one or more of brightness, contrast, and saturation of the image captured by said camera.

4. The imaging apparatus of claim 1, wherein the set of processor-executable instructions further include instructions to:

change, prior to capturing the image, one or more of aperture, shutter speed, and ISO settings of the camera based on aperture, shutter speed, and ISO settings specified as part of the first wireframe, wherein the first and second wireframes of the set of wireframes comprise different aperture, shutter speed, and ISO settings, and wherein the aperture, shutter speed, and ISO settings of the first wireframe are different than automatically selected aperture, shutter speed, and ISO settings selected by the camera.

5. The imaging apparatus of claim 1 further comprising network connectivity, the imaging apparatus using the network connectivity to upload images captured with said camera to remote storage.

6. The imaging apparatus of claim 1, wherein the skeletal framework of each wireframe from the set of wireframes comprises different framing, scaling, and alignment of a same or different part or aspect of the particular vehicle.

7. The imaging apparatus of claim 1 further comprising storage, the storage storing the different sets of wireframes and a set of previously captured images with each set of the different sets of wireframes.

8. The imaging apparatus of claim 7, wherein the set of processor-executable instructions further include instructions to:

present a previously captured image, from the set of previously captured images, that was captured using the first wireframe;

display the first wireframe atop said real-time images in response to input requesting a reshoot of the previously captured photograph.

9. The imaging apparatus of claim 1, wherein the display comprises a touchscreen, and wherein said input interface receives input from said touchscreen.

10. The imaging apparatus of claim 1 further comprising a pair of control handles on either side of the imaging apparatus with one or more of said pair of control handles comprising the input interface.

11. The imaging apparatus of claim 10, wherein the pair of control handles comprises one or more actuators providing input to the input interface with one or more of the actuators controlling image capture by said camera.

12. An imaging apparatus for automating professional-quality photography of a plurality of objects, the imaging apparatus comprising:

a camera;
a display;
a non-transitory computer-readable medium storing (i) a set of processor-executable instructions and (ii) different sets of wireframes with each set of wireframes keyed to a different object of the plurality of objects; and one or more processors configured to execute the set of processor-executable instructions, wherein executing the set of processor-executable instructions causes the one or more processors to:

overlay, in the display, a first presentation of real-time images, from the camera, with a first wireframe from a particular set of wireframes while awaiting capture of a first image of a first part or aspect of a particular object at a first angle, zoom, and framing defined by the first wireframe;

adjust settings of the camera according to a first set of custom settings of the first wireframe, wherein the first set of custom settings are different than default settings of the camera, and wherein the settings of the camera comprise one or more of aperture, shutter speed, and ISO settings;

capture the first image of the first part or aspect of the particular object at the first angle, zoom, and framing using the camera set at the first set of custom settings;

generate a first preprocessed image by adjusting one or more of brightness, contrast, and saturation of the first image according to a first set of postprocessing adjustments defined with the first wireframe;

overlay, in the display, a second presentation of real-time images, from the camera, with a second wireframe from the particular set of wireframes while awaiting capture of a second image of a different second part or aspect of the particular object at a different second angle, zoom, and framing defined by the second wireframe;

adjust the settings of the camera according to a different second set of custom settings of the second wireframe;

capture the second image of the second part or aspect of the particular object at the second angle, zoom, and framing using the camera set at the second set of custom settings; and generate a second preprocessed image by adjusting one or more of brightness, contrast, and saturation of the second image according to a second set of postprocessing adjustments defined with the second wireframe.

13. The imaging apparatus of claim 12, wherein the set of processor-executable instructions further include instructions to:

select the particular object from the plurality of objects based on user input.

14. The imaging apparatus of claim 13 further comprising an input device for receiving the user input, wherein the input device comprises at least one of a touchscreen embedded as part of said display or one or more actuators about side handles of the imaging apparatus.

15. The imaging apparatus of claim 12, wherein the set of processor-executable instructions further include instructions to:

capture the first image of the particular object at the first angle, zoom, and framing by activating the camera in response to detecting substantial alignment between the particular object appearing in the display and the first wireframe.

16. A method comprising:

overlaying, in a display, a first presentation of real-time images with a first wireframe from a particular set of wireframes while awaiting capture of a first image of a first part or aspect of a particular object at a first angle, zoom, and framing defined by the first wireframe;

adjusting settings of a camera according to a first set of custom settings of the first wireframe, wherein the first set of custom settings are different than default settings of the camera, and wherein the settings of the camera comprise one or more of aperture, shutter speed, and ISO settings;

capturing the first image of the first part or aspect of the particular object at the first angle, zoom, and framing using the camera set at the first set of custom settings;

generating a first preprocessed image by adjusting one or more of brightness, contrast, and saturation of the first image according to a first set of postprocessing adjustments defined with the first wireframe;

overlaying, in the display, a second presentation of real-time images with a second wireframe from the particular set of wireframes while awaiting capture of a second image of a different second part or aspect of the particular object at a different second angle, zoom, and framing defined by the second wireframe;

adjusting the settings of the camera according to a different second set of custom settings of the second wireframe;

capturing a second image of the second part or aspect of the particular object at the second angle, zoom, and framing using the camera set at the second set of custom settings; and generating a second preprocessed image by adjusting one or more of brightness, contrast, and saturation of the second image according to a second set of postprocessing adjustments defined with the second wireframe.

* * * * *